United States Patent
Stevenson

(10) Patent No.: US 10,436,265 B2
(45) Date of Patent: Oct. 8, 2019

(54) RIVET-LESS ROTOR CLIP DESIGN

(71) Applicant: GOODRICH CORPORATION, Charlotte, NC (US)

(72) Inventor: John A. Stevenson, Beavercreek, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/673,591

(22) Filed: Aug. 10, 2017

(65) Prior Publication Data

US 2019/0048949 A1 Feb. 14, 2019

(51) Int. Cl.
*F16D 65/12* (2006.01)
*F16D 65/02* (2006.01)

(52) U.S. Cl.
CPC .......... *F16D 65/12* (2013.01); *F16D 65/123* (2013.01); *F16D 65/126* (2013.01); *F16D 2065/1308* (2013.01); *F16D 2065/1348* (2013.01); *F16D 2065/1372* (2013.01); *F16D 2065/1392* (2013.01); *F16D 2250/0084* (2013.01)

(58) Field of Classification Search
CPC ................................ F16D 65/12; F16D 55/36
USPC ......................... 188/18 A, 218 XL
See application file for complete search history.

(56) References Cited

U.S. PATENT DOCUMENTS

| | | | |
|---|---|---|---|
| 3,250,349 A * | 5/1966 | Tayler, Jr. ............... | F16D 55/40 188/218 R |
| 4,007,814 A * | 2/1977 | Berger .................. | F16D 65/121 188/218 XL |
| 4,465,165 A * | 8/1984 | Bok ...................... | F16D 65/126 188/218 XL |
| 4,557,356 A * | 12/1985 | Petersen ............... | F16D 65/126 188/218 XL |
| 4,747,473 A * | 5/1988 | Bok ...................... | F16D 13/64 188/218 XL |
| 4,863,001 A | 9/1989 | Edmisten | |
| 7,442,443 B2 * | 10/2008 | Swank ................... | C22C 38/02 188/251 A |
| 7,766,133 B2 | 8/2010 | Cress | |
| 2007/0193836 A1 | 8/2007 | Walker et al. | |
| 2016/0279710 A1* | 9/2016 | Whittle ................. | B22F 3/1055 |
| 2017/0130790 A1 | 5/2017 | Tremblay | |
| 2018/0128331 A1* | 5/2018 | Stevenson ............... | F16D 55/40 |

* cited by examiner

*Primary Examiner* — Christopher P Schwartz
(74) *Attorney, Agent, or Firm* — Snell & Wilmer, L.L.P.

(57) ABSTRACT

A rotor disk assembly includes a rotor disk. The rotor disk includes a first rotor lug, a second rotor lug circumferentially spaced from the first rotor lug and defining a slot therebetween. The slot is located on a radially outward portion of the rotor disk and the slot has an undercut engagement portion defined by the first rotor lug and the second rotor lug. The undercut engagement portion is positioned circumferentially on the rotor disk to engage a rotor clip.

11 Claims, 4 Drawing Sheets

RIVET-LESS ROTOR CLIP DESIGN

FIELD

The present disclosure relates generally to brake assemblies and more specifically to systems for retaining a rotor clip.

BACKGROUND

Carbon brake disks for aircraft typically utilize clips with rivets as part of the rotor assembly. Removal of the rivets may damage the carbon brake disk, which can be expensive to replace. Floating clips are also utilized in rotor assemblies, which comprise a clip that goes into a slot in the rotor. Clip retainers may also be riveted into the carbon. The clips utilized in floating clips may also cause damage to the carbon brake disk.

SUMMARY

In various embodiments, a rotor disk assembly includes a rotor disk. The rotor disk includes a first rotor lug, a second rotor lug circumferentially spaced from the first rotor lug and defining a slot therebetween, wherein the slot is located on a radially outward portion of the rotor disk and the slot has an undercut engagement portion defined by the first rotor lug and the second rotor lug.

In various embodiments of the rotor disk assembly, the undercut engagement portion is positioned circumferentially on the rotor disk to engage a rotor clip.

In various embodiments of the rotor disk assembly, wherein the undercut engagement portion includes a first undercut and a second undercut.

In various embodiments of the rotor disk assembly, the first undercut is radially inward and circumferentially aligned with a circumferentially protruding bearing face portion of the first rotor lug and the second undercut is radially inward and circumferentially aligned with a circumferentially protruding bearing face portion of the second rotor lug.

In various embodiments of the rotor disk assembly, the circumferentially protruding bearing face portion of the first rotor lug and the circumferentially protruding bearing face portion of the second rotor lug each have a concave shaped portion respectively defining said first undercut and said second undercut each have a concave shaped portion respectively defining said first undercut and said second undercut.

In various embodiments of the rotor disk assembly, the undercut engagement portion is defined by a first partially circular edge on a first side of the slot and a second partially circular edge on a second side of the slot.

In various embodiments of the rotor disk assembly, the undercut engagement portion is defined by a bearing face of the first rotor lug and defined by a bearing face of the second rotor lug.

In various embodiments, a rotor clip includes a first tab engagement portion, an undercut coupling portion coupled to the first tab engagement portion, and a second tab engagement portion coupled to the undercut coupling portion, wherein the undercut coupling portion has a first bump and a second bump.

In various embodiments of the rotor clip, the undercut coupling portion is used to engage the rotor clip into a slot of a rotor disk.

In various embodiments of the rotor clip, the first bump is located at a first end of the undercut coupling portion and the second bump is located at a second end of the undercut coupling portion.

In various embodiments of the rotor clip, the first bump is partially circular and the second bump is partially circular.

In various embodiments of the rotor clip, the rotor clip is held circumferentially onto a rotor disk by using the first tab engagement portion and the second tab engagement portion.

In various embodiments of the rotor clip, the first tab engagement portion is located on a first side of the rotor clip and the second tab engagement portion is located on a second side of the rotor clip.

In various embodiments of the rotor clip, the first tab engagement portion includes a set of two tabs and the second tab engagement portion includes a set of two tabs.

In various embodiments of the rotor clip, the first tab engagement portion includes a single tab and the second tab engagement portion includes a single tab.

In various embodiments of the rotor clip, the rotor clip is configured to be installed into a slot of a rotor disk by snapping a first set of tabs of the first tab engagement portion onto a first rotor lug of the rotor disk and a second set of tabs of the second tab engagement portion onto a second rotor lug of the rotor disk.

In various embodiments of the rotor clip, the rotor clip is installable on a scallop defining a bottom portion of a slot of a rotor disk by sliding the rotor clip onto the scallop.

In various embodiments of the rotor clip, the rotor clip is installable into a slot of a rotor disk by engaging the undercut coupling portion and snapping a first set of tabs of the first tab engagement portion onto a first rotor lug of the rotor disk and a second set of tabs of the second tab engagement portion onto a second rotor lug of the rotor disk.

In various embodiments, a method of inserting a rotor clip into a rotor disk assembly includes aligning the rotor clip to a slot located on a radially outward portion of the rotor disk, engaging a first bump and a second bump of the rotor clip with an undercut engagement portion of the slot of the rotor disk, and snapping a first tab engagement portion and a second tab engagement portion of the rotor clip to contribute to positioning and retaining the undercut coupling portion of the rotor clip radially within the undercut engagement portion of the slot.

In various embodiments of the method, the undercut engagement portion has a first circular edge and a second circular edge positioned to receive the undercut coupling portion.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

Figure 1:
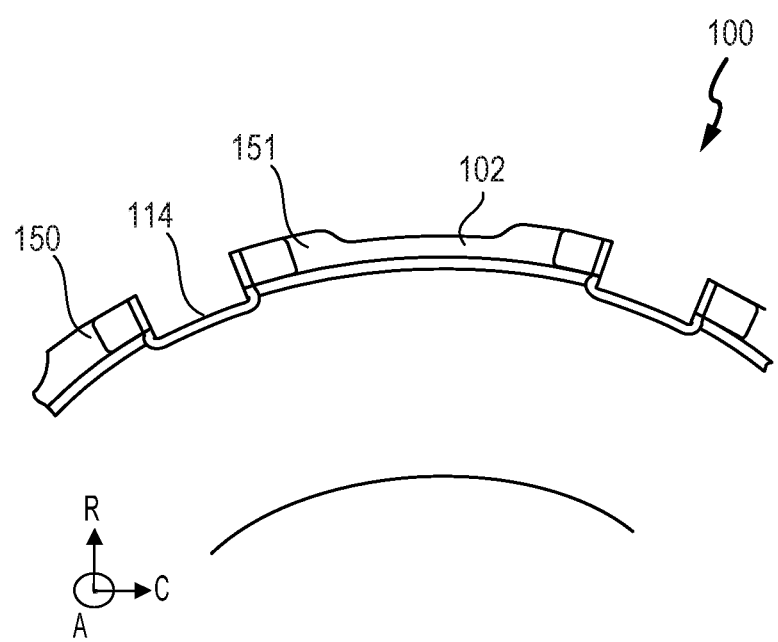
FIG. 1 illustrates, in accordance with various embodiments, a brake disk assembly.

With reference to FIG. 1, a brake disk assembly 100 is illustrated, in accordance with various embodiments. Brake disk assembly 100 may include a rotor disk (also referred to herein as a rotor) 102, and at least one clip (also referred to herein as rotor clip) 114. In various embodiments, brake disk assembly and/or rotor disk 102 may be fabricated using, for example, cast iron, reinforced carbon or ceramic composites. Rotor disk 102 may include a plurality of rotor lugs, including rotor lug 150 and rotor lug 151. Rotor lug 150 and rotor lug 151 may be fixed to the distal surface of rotor disk 102. Rotor lug 150 and rotor lug 151 may be integral to rotor disk 102.

Rotor clip 114 may be coupled to a radially outward portion of rotor 102 when in an installed position. Radially, R, may refer to, for example, the direction of the radius, going from a center outward along the radius or from the circumference inward, along the radius. Circumferentially and/or circumferential direction, C, may refer to heading in a direction corresponding to the circumference of rotor disk 102. For example, circumferentially inward may refer to heading in an inward direction from a designated position in the direction of the circumference of rotor disk 102. Circumferentially outward may refer to heading in an outward direction from a designated position in the direction of the circumference of rotor disk 102. Axial and/or axial direction, A, may refer to, for example, heading in the direction of an axis extending out of or into the center of rotor disk 102. Rotor clip 114, slot 257 (referring to FIG. 2 momentarily), and rotor lug 150 and 151, may be referred to herein collectively as a rotor clip coupling portion 299. Rotor clip coupling portion 299 interfaces with a wheel via a torque bar that rests against rotor clip 114. Rotor clip 114 may serve as the interface between rotor disk 102 and the torque bar attached to a wheel.

Figure 2:
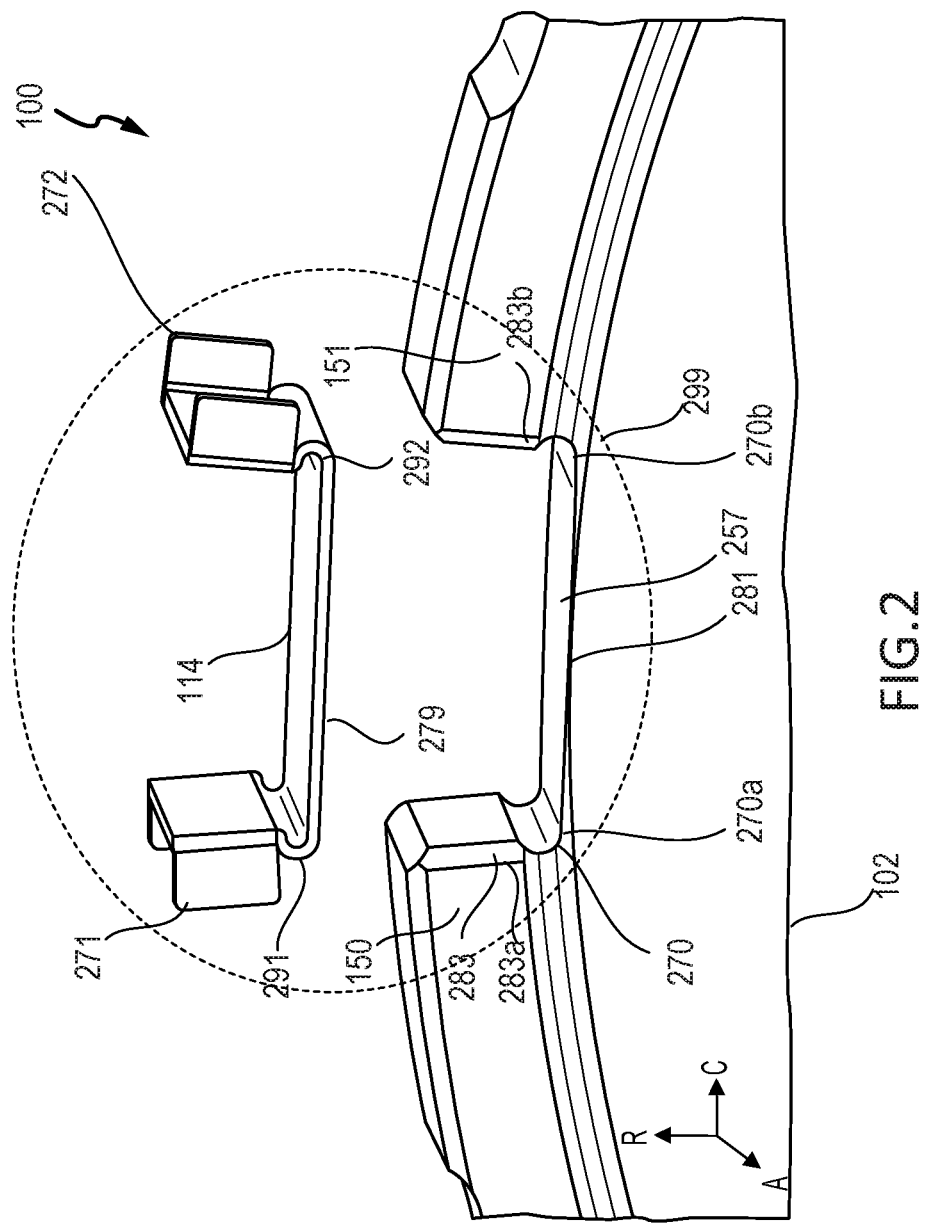
FIG. 2 illustrates, in accordance with various embodiments, a closer view of a brake disk assembly.

With reference to FIG. 2, rotor clip 114 is shown according to various embodiments. During operation of brake disk assembly 100, rotor clip 114 may be held in place on rotor disk 102 utilizing an undercut engagement portion 270 of slot 257, defined by rotor lugs 150 and 151, and an undercut coupling portion 279 of rotor clip 114. Undercut engagement portion 270 may be, for example, positioned circumferentially on rotor disk 102 to engage rotor clip 114 and be defined by the bearing faces 283 (283a, 283b) of rotor lug 150 and rotor lug 151, and a scallop 281 portion connecting the bearing faces 283 of the adjacent lugs. Undercut coupling portion 279, may be, for example, the portion of rotor clip 114 designed to be affixed to undercut engagement portion 270. Undercut coupling portion 279 may include a first bump 291 on one end and a second bump 292 on an opposite end. In various embodiments, bump 291 may be in the shape of a partially circular end and bump 292 may be in the shape of a partially circular end. In various embodiments, the shape of bumps 291 and 292 may be rounded, a half-circle, elliptical, rectangular, triangular, or any other shape and dimensions that are complementary to the shape and dimensions of the bearing face 283 portions that define a first undercut 270a and a second undercut 270b. In various embodiments, bump 291 and bump 292 clip into first undercut 270a of undercut engagement portion 270 and second undercut 270b of undercut engagement portion 270. In various embodiments, first undercut 270a may be positioned such that it is radially inward and circumferentially aligned with a circumferentially protruding bearing face portion of the first rotor lug 150. In various embodiments, the second undercut 270b may be positioned such that it is radially inward and circumferentially aligned with a circumferentially protruding bearing face portion of the second rotor lug 151. Undercut engagement portion 270 is located radially inward of circumferentially protruding bearing face portions 283a and 283b. In various embodiments, the shape of the bearing face 283 portions defining the first undercut 270a and the second undercut 270b may be curved, concave or any other shape where the defining surface of bearing face 283 is aligned in a circumferential direction with bearing face portions 283a and 283b. In various embodiments, undercut engagement portion 270 may be circumferentially inward of the bearing face portions 283a and 283b of rotor lug 150 and rotor lug 151, respectively, to a degree that allows the combination of undercut coupling portion 279 of rotor clip 114 and undercut engagement portion 270 to provide mechanical retention ability to rotor clip 114.

In various embodiments, rotor clip 114 may engage with rotor disk 102 utilizing first bump 291 and second bump 292 located on either side of rotor clip 114. In various embodiments, rotor clip 114 may be inserted into slot 257 from a radially outward to inward direction. In various embodiments, first bump 291 and second bump 292 may fit into undercut engagement portion 270 of rotor disk 102. In various embodiments, rotor clip 114 may be held circumferentially onto rotor disk 102 by the use of tab engagement portion 271 and tab engagement portion 272 located on either side of rotor clip 114. In various embodiment, tab engagement portion 271 and tab engagement portion 272 may be clippable, i.e., capable of being clipped, to rotor lug 150 and 151. Tab engagement portion 271 and tab engagement portion 272 may, for example, bend circumferentially outward in opposite directions to allow rotor clip 114 to lock in place on rotor lug 150 and rotor lug 151, respectively. In order to support rotor clip 114, rotor clip 114 may be placed radially outward of scallop 281 that defines a bottom portion and/or engagement portion 270 of slot 257. In various embodiments, slot 257 is located between rotor lug 150 and rotor lug 151 and designed to encompass rotor clip 114. For example, slot 257 may be designed such that bump 291 and bump 292 fit directly into first undercut 270a and second undercut 270b of undercut engagement portion 270 of slot 257. A first end of slot 257 may be defined by a side-wall, e.g., bearing face 283a, of rotor lug 150 and a second end of slot 257 may be defined by a side-wall, e.g., bearing face 283b, of rotor lug 151, as depicted in, for example, FIG. 2

In various embodiments, rotor clip 114 may be fabricated from various metals and metal alloys, such as cobalt-chromium alloys, such as the cobalt-chromium alloy sold commercially under the mark STELLITE. In various embodiments, rotor clip 114 may also be manufactured from non-metallic materials that allow rotor clip 114 to be manufactured using casting or other additive manufacturing process. In various embodiments, rotor clip 114 may be installed by snapping rotor clip 114 onto rotor disk 102 to engage undercut engagement portion 270 of rotor disk 102. In various embodiments, in order to install rotor clip 114 into slot 257, tab engagement portion 271 and tab engagement portion 272 may be snapped to contribute to positioning and retaining undercut coupling portion 279 of rotor clip 114 radially within undercut engagement portion 270 of slot 257 of rotor disk 102. In various embodiments, rotor clip 114 may be installable or be installed by sliding rotor clip 114 circumferentially into undercut engagement portion 270 and tabs 290 may be bent to contact the sides of rotor lug 150 and rotor lug 151 in order to retain the rotor clip 114 circumferentially onto rotor disk 102.

In various embodiments, rotor clip 114 may be pressed into scallop 281 in a radially inward motion. In various embodiments, rotor clip 114 may be installable or installed into scallop 281 by sliding rotor clip 114 into scallop 281 from the axial side of slot 257 (See momentarily FIG. 3, which, as shown, similarly depicts rotor clip 314 being positioned to slide into scallop 381 from the axial side of slot 357). In various embodiments, a single tab or multiple tabs (e.g., two tabs) of tab engagement portion 271 and tab engagement portion 272 may be bent circumferentially outward to keep rotor clip 114 from moving either circumferentially or radially on rotor disk 102. In various embodiments, rotor clip 114 may be removed by either displacing rotor clip 114, bending rotor clip 114, or re-bending the tab/s of tab engagement portion 271 and tab engagement portion 272 and removing rotor clip 114. In various embodiments, in the event that rotor clip 114 becomes damaged, rotor clip 114 may be easily removed and reinstalled.

Figure 3:
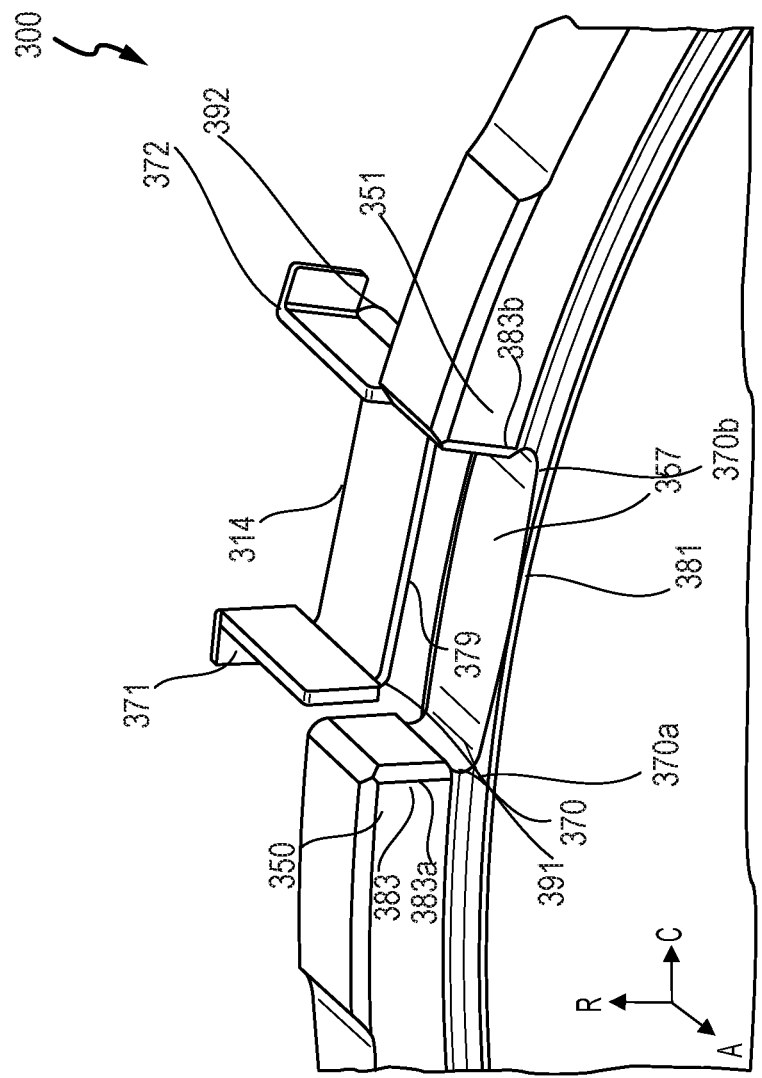
FIG. 3 illustrates, in accordance with various embodiments, a closer view of a brake disk assembly.

With reference to FIG. 3, a brake disk assembly 300 is illustrated, in accordance with various embodiments. Rotor clip 314 is similar in design to rotor clip 114, however, tab 371 and tab 372 include only a single tab. Rotor clip 314 may be held in place on rotor disk 102 utilizing an undercut engagement portion 370 of slot 357, defined by rotor lugs 350 and 351, and an undercut coupling portion 379 of rotor clip 314. Undercut engagement portion 370 may be, for example, defined by the bearing faces 383 of rotor lug 350 and rotor lug 351, and a scallop 381 portion connecting the bearing faces 383 of the adjacent lugs. Undercut coupling portion 379, may be, for example, the portion of rotor clip 314 designed to be affixed to undercut 370. Undercut coupling portion 379 may include a first bump 391 on one end and a second bump 392 on an opposite end. In various embodiments, bump 391 may be in the shape of a partially circular end and bump 392 may be in the shape of a partially circular end. In various embodiments, the shapes of bumps 391 and 392 may be rounded, a half-circle, or any other shape and dimensions that are complementary to the shape and dimensions of the bearing face 383 portions that define a first undercut 370a and a second undercut 370b. In various embodiments, bump 391 and bump 392 clip into first undercut 370a of undercut engagement portion 370 and second undercut 370b of undercut engagement portion 370. Undercut engagement portion 370 is located radially inward of circumferentially protruding bearing face portions 383a and 383b. In various embodiments, the shape of the bearing face 383 portions defining the first undercut 370a and the second undercut 370b may be curved, concave or any other shape where the defining surface of bearing face 383 is aligned in a circumferential direction with bearing face portions 383a and 383b. In various embodiments, undercut engagement portion 370 may be circumferentially inward of the bearing face portions 383a and 383b of rotor lug 350 and rotor lug 351, respectively, to a degree that allows the combination of undercut coupling portion 379 of rotor clip 314 and undercut engagement portion 370 to provide mechanical retention ability to rotor clip 314.

In various embodiments, rotor clip 314 may engage with rotor disk 102 utilizing first bump 391 and second bump 392 located on either side of rotor clip 314. In various embodiments, rotor clip 314 may be inserted in to slot 357 from a radially outward to inward direction. In various embodiments, first bump 391 and second bump 392 may fit into undercut engagement portion 370 on rotor disk 102. In various embodiments, rotor clip 314 may be held circumferentially onto rotor disk 102 by the use of tab engagement portion 371 and tab engagement portion 372 located on either side of rotor clip 314. In various embodiment, tab engagement portion 371 and tab engagement portion 372 may be clippable to rotor lug 350 and 351. Tab engagement portion 371 and tab engagement portion 372 may, for example, bend circumferentially outward in opposite directions to allow rotor clip 314 to lock in place on rotor lug 350 and rotor lug 351, respectively. In order to support rotor clip 314, rotor clip 314 may be placed radially outward of scallop 381 that defines a bottom portion and/or engagement portion 370 of slot 357. In various embodiments, slot 357 is located between rotor lug 350 and rotor lug 351 and designed to encompass rotor clip 314. For example, slot 357 may be designed such that bump 391 and bump 392 fit directly into first undercut 370a and second undercut 370b of undercut engagement portion 370 of slot 357. A first end of slot 357 may be defined by a side-wall, e.g., bearing face 383a, of rotor lug 350 and a second end of slot 357 may be defined by a side-wall, e.g., bearing face 383b, of rotor lug 351, as depicted in, for example, FIG. 3

Figure 4:
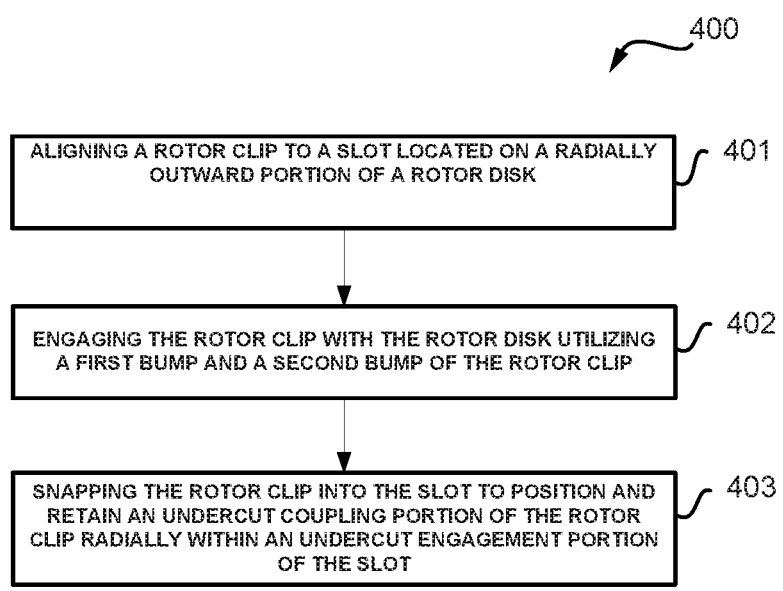
FIG. 4 illustrates, in accordance with various embodiments, a method of inserting a rotor clip into a rotor disk assembly.

With reference to FIG. 4, a method of inserting a rotor clip 114, 314 into a brake disk assembly 100, 300 is provided, in accordance with various embodiments. In various embodiments, in step 401, method 400 may include aligning a rotor clip 114, 314 to a slot 257, 357. In step 402, method 400 may include engaging a first bump and a second bump of the rotor clip 114, 314 with undercut engagement portion 270, 370 of the slot 257, 357 of rotor disk 102. In step 403, method 400 may include snapping the rotor clip 114, 314 into the slot 257, 357 to position and retain an undercut coupling portion 279,379 of rotor clip 114, 314 radially within an undercut engagement portion 270, 370 of slot 257, 357.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A rotor clip, comprising:
   a first tab engagement portion;
   a monolithic undercut coupling portion having a flat bottom surface and being coupled to said first tab engagement portion; and
   a second tab engagement portion coupled to said undercut coupling portion, wherein said monolithic undercut coupling portion has a first bump having a first curved surface extending upward from the flat bottom surface to the first tab engagement portion and a second bump having a second curved surface extending upward from the flat bottom surface to the second tab engagement portion,
   the first bump and the second bump being entirely above the flat bottom surface, wherein said first tab engagement portion includes a first single tab and said second tab engagement portion includes a second single tab.

2. The rotor clip of claim 1, wherein said undercut coupling portion is used to engage said rotor clip into a slot of a rotor disk.

3. The rotor clip of claim 1, wherein said first bump is partially circular and said second bump is partially circular.

4. The rotor clip of claim 1, wherein said rotor clip is held circumferentially onto a rotor disk by using said first tab engagement portion and said second tab engagement portion.

5. The rotor clip of claim 1, wherein said first tab engagement portion is located on a first side of said rotor clip and said second tab engagement portion is located on a second side of said rotor clip.

6. The rotor clip of claim 1, wherein said first tab engagement portion includes a set of two tabs and said second tab engagement portion includes a set of two tabs.

7. The rotor clip of claim 1, wherein said rotor clip is configured to be installed into a slot of a rotor disk by snapping a first set of tabs of said first tab engagement portion onto a first rotor lug of said rotor disk and a second set of tabs of said second tab engagement portion onto a second rotor lug of said rotor disk.

8. The rotor clip of claim 1, wherein said rotor clip is installable into a slot of a rotor disk by engaging said undercut coupling portion and snapping a first set of tabs of said first tab engagement portion onto a first rotor lug of said rotor disk and a second set of tabs of said second tab engagement portion onto a second rotor lug of said rotor disk.

9. A method of inserting a rotor clip into a rotor disk assembly, comprising:
   aligning said rotor clip having a flat bottom surface to a slot located on a radially outward portion of said rotor disk assembly;
   bending a first tab engagement portion and a second tab engagement portion of said rotor clip circumferentially outward and pressing said rotor clip radial inward toward the slot;
   engaging a first bump of said rotor clip a first undercut of the slot and a second bump of said rotor clip with a second undercut of the slot by pressing said rotor clip radially inward; and
   snapping a first tab engagement portion of said rotor clip and a second tab engagement portion of said rotor clip to contribute to positioning and retaining an undercut coupling portion of said rotor clip radially within said undercut engagement portion of said slot.

10. The method of claim 9, wherein said undercut engagement portion has a first circular edge and a second circular edge positioned to receive said undercut coupling portion.

11. A rotor disk assembly, comprising:
   a rotor disk comprising:
      a first rotor lug; and
      a second rotor lug circumferentially spaced from said first rotor lug and defining a slot therebetween, wherein said slot is located on a radially outward portion of said rotor disk and said slot has an undercut engagement portion defined by said first rotor lug and said second rotor lug; and
   a rotor clip comprising:
      a first tab engagement portion disposed in the a first portion of the undercut engagement portion defined by the first rotor lug;
      a monolithic undercut coupling portion having a flat bottom surface and being coupled to said first tab engagement portion; and
      a second tab engagement portion coupled to said undercut coupling portion, the second tab engagement portion being disposed in a second undercut engagement portion defined by the second rotor lug, wherein said monolithic undercut coupling portion has a first bump having a first curved surface extending upward from the flat bottom surface to the first tab engagement portion and a second bump having a second curved surface extending upward from the flat bottom surface to the second tab engagement portion, wherein said first tab engagement portion includes a first single tab and said second tab engagement portion includes a second single tab.

* * * * *